United States Patent
Elliott

[15] 3,651,322
[45] Mar. 21, 1972

[54] DEVICE FOR GAS ANALYSIS

[72] Inventor: William G. Elliott, Lincoln, Mass.

[73] Assignee: SpectraMetrics, Incorporated, Burlington, Mass.

[22] Filed: May 6, 1970

[21] Appl. No.: 35,250

Related U.S. Application Data

[63] Continuation-in-part of Ser. No. 710,992, Apr. 5, 1968, abandoned.

[52] U.S. Cl. ..................250/43.5 R, 356/51, 356/81, 356/85
[51] Int. Cl. .........................................G01n 21/26
[58] Field of Search..................250/43.5 R; 356/51, 81, 82, 356/85, 86, 87

[56] References Cited

UNITED STATES PATENTS

| | | | |
|---|---|---|---|
| 3,428,401 | 2/1969 | Buzza | 356/81 X |
| 2,333,762 | 11/1943 | Bertrand | 356/85 |
| 3,383,515 | 5/1968 | Cobb et al. | 356/81 X |
| 3,171,882 | 3/1965 | Baird | 356/81 |

*Primary Examiner*—Anthony L. Birch
*Attorney*—Richard P. Crowley and Richard L. Stevens

[57] ABSTRACT

A gas analysis device comprising a housing with a heated element and a gas therein as the source of radiation and a detector for the emitted radiation. Preferably, a chopper or other means are employed to permit the emission from the element and the gas to fall alternately on the detector. In an alternate embodiment, the gas in the source is of known emission characteristics and a gas to be analyzed is interposed between the source and the detector.

30 Claims, 3 Drawing Figures

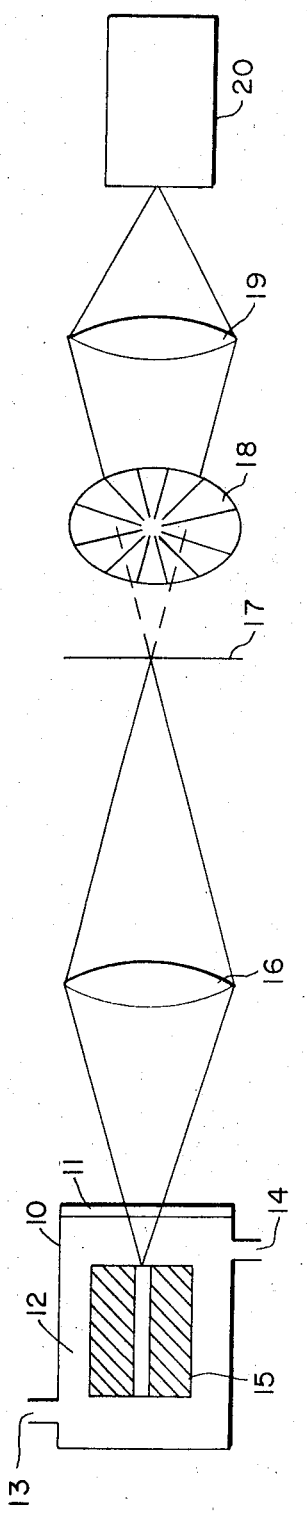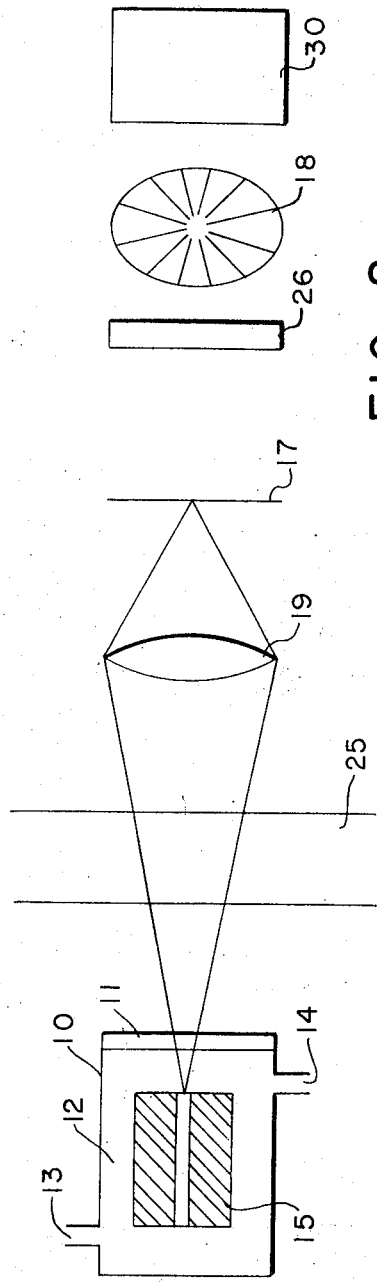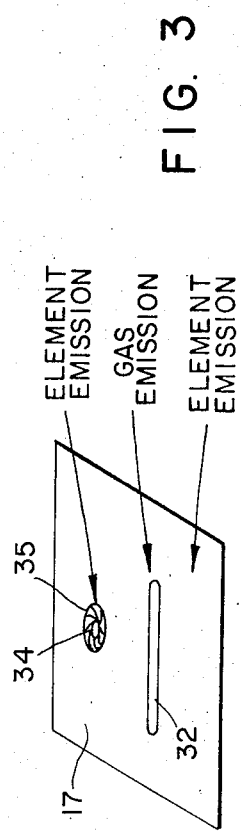
FIG. 1
FIG. 2
FIG. 3
INVENTOR
WILLIAM G. ELLIOT
BY Crowley & Stevens
ATTORNEYS

DEVICE FOR GAS ANALYSIS

CROSS-REFERENCE TO RELATED APPLICATION

This application is a continuation-in-part of Ser. No. 710,992, filed Apr. 5, 1968, now abandoned.

BACKGROUND OF THE INVENTION

This invention is directed to a novel device and method for the analysis of the thermal emission of gases, and particularly such devices of the nondispersive type.

A number of devices for measuring the emission spectra and other characteristics of gases have been known to the art. In general, these devices consist of a source of radiation which provides a beam of radiant energy which impinges on a sample of the gas to be detected whereby energy is absorbed by the unknown gas sample. The radiant energy then impinges upon a pair of sensitive elements or detectors. The detectors generally comprise a body of gas and means for measuring the changes in the pressure of the gases due to the changes in the radiant energy reaching the gases in the detectors. Specifically, the detector may comprise a sample of reference gas in connection with a modified membrane wherein a continuous source of radiation passes through the gas to be analyzed and is divided into halves of a detector cell. The detector cell is heated by the absorbed energy in accordance with its own absorption characteristics. The fluctuation of the membrane wall based on the difference in absorption energy of either side provides a measurement of the changes in the radiant energy impinging the gases in the detector. As examples of prior art gas measuring operation, mention will be made of U.S. Pat. Nos. 2,924,713 and 3,234,380.

Prior art devices, however, are deficient in several respects. For example, the transmission of the electromagnetic radiation through a medium which produced scattering or which diminishes the intensity of the transmission, such as air containing dust, smoke, moisture, or other suspended material results in a relatively useless measurement. In addition, the absorption spectrum of the cold gas in the detector is different from the emission or absorption spectrum of the hot gas being measured; hence erroneous results are obtained.

SUMMARY OF THE INVENTION

A novel nondispersive type of device for analyzing gases has now been found which is not susceptible to the deficiencies of the prior art.

The novel device of the present invention comprises a radiant energy source consisting of a gas and heated element which provide a region of gas emission and a region of heating element emission, means for simultaneously displaying the emissions of the gas and element, and detector means. The radiant energy source comprises at least one heated element surrounded by a gas in a housing with a window therein to permit the beam of radiation which includes the two regions from the housing to be transmitted to a detector. Preferably, imaging optics are employed to focus the radiation from the source. A chopper or other device permits alternate observation by the detector of the radiation emitted by the gas and the radiation emitted by the heated element and includes optical attenuation to control the radiation emitted by either the gas or the element such that a null signal is obtained during the alternation. Increases or decreases in the concentration of the gas under consideration may then be determined by the departures from the null condition. In balancing the detector system, a quantitative measure of the known or unknown sample gas is available.

The employment of gas in conjunction with a heated element eliminates temperature dependency in the device. The gas in the tube with the heated element can be the unknown gas for measurement or can be a reference gas of known emission characteristics.

In an alternative embodiment, a radiant energy source employing a reference gas of known emission characteristics is so arranged that the beam emitted therefrom passes through a stream of gas to be analyzed. The detector will measure the amount of imbalance between the emission from the radiant energy source alone and the emission which has passed through the unknown gas. The amount of imbalance is a measure of the absorption in the unknown which corresponds to the emission bands in the reference gas.

BRIEF DESCRIPTION OF THE DRAWINGS

In the drawings:

FIG. 1 is an illustration in block diagrammatical form of the novel gas analysis device of the present invention;

FIG. 2 is an illustration in block diagrammatical form of an alternate embodiment of the novel gas analysis device of the present invention; and FIG. 3 is a schematic illustration of the emissions received on an image plane.

DESCRIPTION OF THE PREFERRED EMBODIMENTS

Referring now to the drawings, FIG. 1 shows a housing 10 with a window 11 and containing a gas 12 and heated element 15 therein. The gas is circulated through housing 10 by means of inlet 13 and outlet 14. Alternatively, the housing is charged with a gas and inlet 13 and outlet 14 are closed thereby maintaining a noncirculating gas atmosphere therein. The element is preferably heated by electric current. The emitted radiation from the housing is transmitted through window 11 and the image 17 of the heated gas 12 and element 15 is focused by condensing optics 16. As shown more clearly in reference to FIGS. 1 and 3, the image plane receives both the radiation of the gas 12 and the heated element 16, the radiation of the gas surrounded by the radiation from the heated element. The region of gas emission is approximately in the center of the image plane 17 which corresponds to the region of gas emission from the center of the cylindrical element 15. The image of the gas and element are scanned alternately by means of chopper 18. As shown, the chopper 18 is adapted to alternate between transmitting the image of the element and of the hot gas to the detector. The condensing optics 19 focuses the alternate beams of radiation emitted from the element and the gas on a suitable detection device, in this case spectrometer 20 which is synchronized with said chopper.

In air pollution control various codes and regulations usually require that the amounts of pollutants emitted into the air be kept below a predetermined amount. In the operation of my invention, assume that the maximum concentration of $SO_2$ that may be discharged into the air is 1%. The element 15 for purposes of illustration will be referred to as a ceramic cylinder at a temperature between about 500° to 1000° C. One percent $SO_2$ in ambient air 12 is introduced into the housing 10. The ceramic element has a continuous emission in the above temperature range of between about 6 to 10 microns. The $SO_2$ has a discontinuous emission in the above temperature range of between about 7–7.5 and 8.5–9 microns. At a fixed temperature the emission of the element is generally constant, say for example, 8.5 microns. At this same temperature the emission of the $SO_2$ may be 7.5 microns. Both the emissions from the housing, that is the element and gas, fall in the image plane 17 after being focused by imaging optics 16. As shown in FIG. 3, the apertures 32 and 34 limit the field of view to a region of gas emission and a region of element emission respectively. Attenuation means 35 such as an iris is disposed in the image plane 17 about the aperture 34. As shown a chopper provides alternate observations of the emitted radiation of the gas and element respectively. This alternating emitted radiation strikes the detection device 20. The detector receives the radiation and converts the same to an electrical signal. The signal may then be amplified and compared. The attenuation means 35 is adjusted, in this example, to reduce the intensity of the radiation being received from the element until it matches the radiation from the gas.

As shown, the optical attentuator is located in the viewing path of the heating element so that the effective radiation from it is reduced to the level of the effective radiation from heated gas sample. In other words, the optical spectral emissitivity of the heating element through the use of the attenuator is adjusted to compensate for the difference in the respective spectral emissions. Once the spectral emissitivity has been balanced, the null is relatively independent of temperature. However, the effective emissivity of the gas sample will change as a function of the gas concentration. Therefore, the departure from null can be used as a measure of concentration of the gaseous constituents with relatively little influence due to temperature variation.

Although described and shown where the attenuating means is disposed within the viewing path of the emission of the heating element, it is clear that attenuating means may also be disposed in the viewing region within the viewing planes of both the emission of the heating element and the gas. The purpose as described to FIGS. 1 and 3 is to obtain a null or balance between the emissions of the gas and heated element. If in fact the emission of the gas is greater than that of the heated element, then of course the gas emission may be attenuated to match that of the element emission.

Once the system has been calibrated, that is the null signal obtained, the ambient air with the unknown amount of $SO_2$ is introduced into the housing 10. As before, the respective emissions of the gas and element are received on the image plane and alternatively fall on the detector 20 by the rotation of chopper 18. If the concentration of the $SO_2$ in the sample is greater than or less than the concentration of the $SO_2$ in the calibrated sample this difference will be reflected in the departure or variation from the null signal.

More specifically since the null signal has been obtained, this may be reflected on a scale in analog form such as a meter wherein the needle within the meter indicates a fixed value such as zero or some other arbitrary figure. If the sulfur dioxide $SO_2$ in the unknown is greater than that which was in the calibration sample, then the needle will deflect indicating that the intensity now being received through the aperture 32 is greater than that which is being received through the aperture 34. This departure from the null signal would then indicate an increased or greater concentration of $SO_2$. Conversely, if the amount of $SO_2$ in the sample is less than that which was in the calibration sample, then the needle would deflect in the opposite direction indicating on the departure from the null signal that the sample contains less $SO_2$.

FIG. 2 illustrates another embodiment of the novel device of the present invention wherein an unknown gas is analyzed by placing the stream of the gas between the source and the detection device. In FIG. 2, element 15 and reference gas 12 are heated in housing 10 containing window 11. Inlet and outlet ports 13 and 14 are shown, but optionally the housing may be sealed with the gas therein. As before, the radiation emitted from both the heated element and the gas are received on the detector and a null signal is obtained. For example, a compensating filter (not shown) is adjusted to provide zero modulation as chopper 18 rotates. Sample gas stream 25 is located in the path of the radiation from the housing 10. A change in the concentration or composition of the sample gas 25 in the sensing path will cause a change in output; either an increase or decrease from the adjustment concentration, and will be sensed by an appropriate detection device 30.

The novel device of the present invention is particularly useful for measuring gases in stream, i.e., in a process pipe or preferably, in determining the exhaust components from a smoke pipe for air pollution control. In employing the novel device of the present invention in process streams, the sample gas to be analyzed would be located so that the beam of radiation emitted from a source composed of a heated element and a reference gas would pass through the sample gas. As described above, a suitable detector would measure the absorption of the incident beam due to the sample gas stream. Smoke or other such interfering material will diminish all components of the beam from the radiant energy source of the same extent, thus negating any effect of the normally interfering material on the measurements.

The structure of the heating element is not critical. A wire filament in a tube surrounded by the gas may be employed. Preferably, a cylindrical heating element is employed with a hollow portion to contain the gas. Heating may be accomplished internally or externally, by electricity, flame or other suitable means.

Alternative means for scanning the thermal radiation from the electrically heated elements and the thermal emission from the gas include a chopper, moving mirrors, two or more suitable detectors so placed that each measures a different component of the emission radiation impinging thereon, or a servo-motor operated optical shutter.

A variety of detectors can be employed with the novel device of the present invention. For example, in one embodiment a photocell is employed to measure increases and decreases in output of the radiation beams which indicate concentration changes. In a preferred embodiment, such as the system illustrated in FIG. 1, the detector means include a spectrometer to obtain the emission spectrum of the gas in question. The system shown in FIG. 2, a broad-band infrared detector is preferably employed. Other suitable detectors including ultraviolet and gas filled detectors, known to the art can also be employed at the option of the operator depending upon the type of information desired from the analysis. As stated above, because the source of radiation includes both the heated filament and the gas, the temperature dependence generally found in prior art devices is absent in the novel device of the present invention.

The novel device of the present invention is particularly suitable in analyzing gases such as oxides of sulphur, oxides of nitrogen, oxides of carbon, hydrocarbons, hydrocarbon breakdown products, hydrogen sulfides and the like. From the foregoing list, it will be seen that the device has particular utility in air pollution control.

Where two gases with common spectral characteristics are employed, e.g. carbon dioxide and sulphur dioxide, a spectral filter 26 which may be a tube containing the interfering gas, is introduced into the path of the radiation beam to remove the absorption due to the common spectral bands. The unique characteristics can then be measured.

I claim:
1. A device for gas analysis comprising:
a housing containing at least a first heated radiant element and a radiant gas as a source of continuous and discontinuous spectral spatially separated emissions;
detector means responsive to the emissions of said gas and said heated element; and
means to admit selectively to said detector the emissions of both said gas and said heated element.

2. The device of claim 1 wherein the housing includes means to introduce a gas into the housing and means to withdraw a gas from the housing.

3. The device of claim 1 wherein the means to admit selectively the spectral emissions to the detector includes a chopper.

4. The device of claim 1 which includes means to focus the spectral emissions.

5. The device of claim 1 wherein the detector means comprises a broad band infrared detector.

6. The device of claim 1 wherein the detector means comprises a spectral photometer.

7. The device of claim 1 which includes means to provide a reference gas in the path of the emissions from the housing.

8. The device of claim 1 wherein the detection means includes means to detect the intensities of the spectral emissions of the heated element and gas.

9. The device of claim 1 which includes means to attenuate the intensity of one of said emissions to match that of the other of said emissions.

10. The device of claim 9 which includes means to monitor the degree of attenuation.

11. The device of claim 1 which includes means to admit alternately to the detection means the emissions of both the gas and the heated element.

12. The device of claim 11 wherein the means to admit alternately the emissions of the heated element and the gas includes a chopper.

13. A device for gas analysis comprising:
   at least a first heated radiant element and a radiant gas as a source of continuous and discontinuous spectral spatially separated emissions;
   means to attenuate the intensity of one of said emissions to match that of the other of said emissions;
   detector means responsive to the emissions of the gas and heated element; and
   chopper means to admit alternately to the detector means the emissions of the gas and heated element.

14. The device of claim 13 which includes means to provide a reference gas in the path of the emissions from the housing.

15. A method for determining composition of unknown gases which comprises:
   a. heating a radiant element in an atmosphere of radiant gas to provide a continuous emission spectra and a discontinuous spatially separated emission spectra;
   b. detecting the continuous emission spectra of the radiant element;
   c. detecting the discontinuous emission spectra of the radiant gas;
   d. comparing the relative intensities of the continuous and discontinuous spectral emissions;
   e. attenuating the intensities of one of said emissions to produce a null signal; and
   f. detecting the difference in intensities between the continuous and discontinuous emissions of the radiant element and the radiant gas.

16. The method of claim 15 which includes attenuating the intensities of the continuous emission spectra to match that of the discontinuous emission spectra.

17. The method of claim 15 which includes attenuating the discontinuous emission of the radiant gas to match that of the continuous emission spectra of the radiant element.

18. The method of claim 15 which includes detecting selectively the spectral continuous and discontinuous emissions of the element and radiant gas.

19. The method of claim 18 which includes chopping the spectral emissions prior to detecting said emissions.

20. The method of claim 19 which includes detecting alternately the continuous and discontinuous emission spectras.

21. The method of claim 15 which includes focusing the spectral emissions prior to attenuating said emissions.

22. The method of claim 15 which includes focusing the spectral emissions subsequent to attenuating said emissions.

23. The method of claim 15 which includes:
   introducing a reference gas in the optical path of the continuous and discontinuous emissions subsequent to obtaining a null signal of the continuous and discontinuous emissions of steps (a) through (e); and
   detecting the variation from the null signal caused by the introduction of the reference gas.

24. The method of claim 23 wherein the reference gas contains an unknown constituent to be analyzed.

25. A method of gas analysis which comprises:
   a. heating a radiant element in an atmosphere of radiant gas to provide a continuous emission spectra and a discontinuous spatially separated emission spectra;
   b. comparing the relative intensities of the emission spectras;
   c. attenuating the intensity of one of said emissions to provide a null signal;
   d. detecting the null signal;
   e. providing an atmosphere of an unknown radiant gas about the radiant element to provide a second discontinuous emission spectra;
   f. detecting the difference in intensities of the null signal and the second discontinuous spectral emission; and
   g. measuring said difference.

26. The method of claim 25 which includes attenuating the intensities of the continuous emission spectra to match that of the discontinuous emission spectra.

27. The method of claim 25 which includes attenuating the discontinuous emission of the radiant gas to match that of the continuous emission spectra of the radiant element.

28. The method of claim 25 which includes focusing the spectral emissions prior to attenuating said emissions.

29. The method of claim 25 which includes focusing the spectral emissions subsequent to attenuating said emissions.

30. The method of claim 25 which includes:
   introducing a reference gas in the optical path of the continuous and discontinuous emissions subsequent to obtaining a null signal of the continuous and discontinuous emissions of steps (a) through (d); and
   detecting the variation from the null signal caused by the introduction of the reference gas.

* * * * *